United States Patent
Luke et al.

(10) Patent No.: US 6,595,062 B1
(45) Date of Patent: Jul. 22, 2003

(54) HIGH TEMPERATURE RAKE FOR SUSPERSONIC FLOW

(75) Inventors: Richard Stanley Luke, Weatherford, TX (US); Mark Goldman McGee, Fort Worth, TX (US); John William Pierce, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/871,477

(22) Filed: May 31, 2001

Related U.S. Application Data
(60) Provisional application No. 60/240,640, filed on Oct. 16, 2000.

(51) Int. Cl.[7] .................................................. G01L 7/00
(52) U.S. Cl. ........................................ 73/714; 73/170.02
(58) Field of Search .............................. 73/714, 170.02, 73/700, 756

(56) References Cited

U.S. PATENT DOCUMENTS

| | | | |
|---|---|---|---|
| 4,003,249 A | 1/1977 | Laskody ..................... 73/117.4 |
| 4,483,195 A | 11/1984 | Brown et al. ................. 73/702 |
| 4,595,298 A | * 6/1986 | Frederick ..................... 374/144 |
| 4,788,855 A | 12/1988 | Laskody ..................... 73/117.4 |
| 4,815,294 A | * 3/1989 | David ........................... 60/595 |
| 5,211,007 A | * 5/1993 | Marvin ........................ 60/204 |
| 5,618,353 A | * 4/1997 | Irvine et al. .............. 134/22.17 |
| 6,062,811 A | * 5/2000 | Zombo et al. .............. 415/118 |
| 6,385,958 B2 | * 5/2002 | Leone et al. .................. 60/772 |
| 6,393,825 B1 | * 5/2002 | Leone et al. .................. 60/785 |

\* cited by examiner

*Primary Examiner*—Hezron Williams
*Assistant Examiner*—Andre Allen
(74) *Attorney, Agent, or Firm*—Bracewell & Patterson, L.L.P.

(57) ABSTRACT

An apparatus measuring the temperature and/or pressure of an exhaust gas plume from a supersonic military jet engine. The apparatus includes a rotatable airfoil having one or more sensors that are impinged by the exhaust gas flow path prior to the exhaust gas flowing over the airfoil. At least one base is attached and adapted to be mounted to a supporting surface for locating the airfoil rearward of the exhaust gas plume.

12 Claims, 6 Drawing Sheets

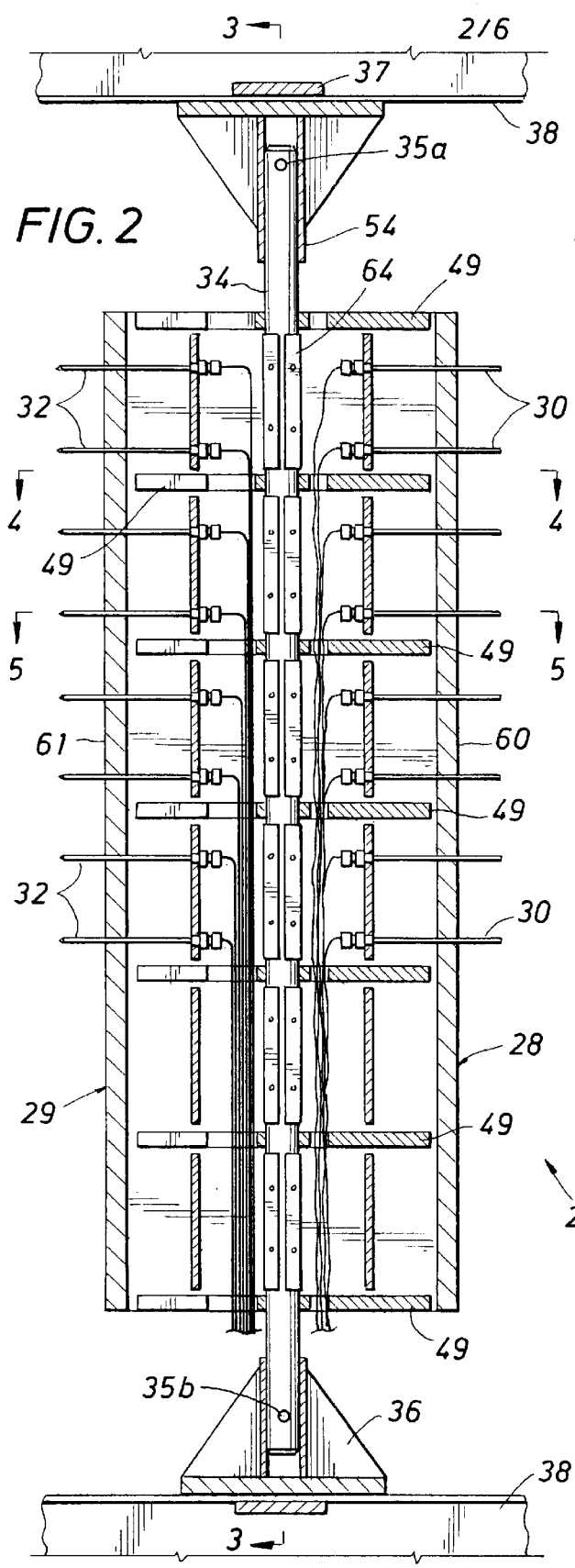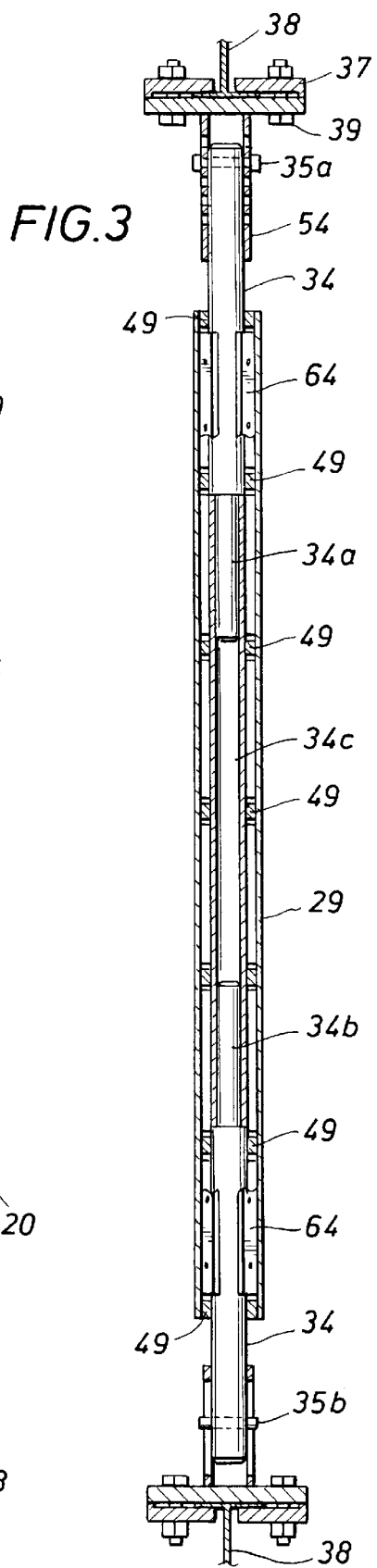

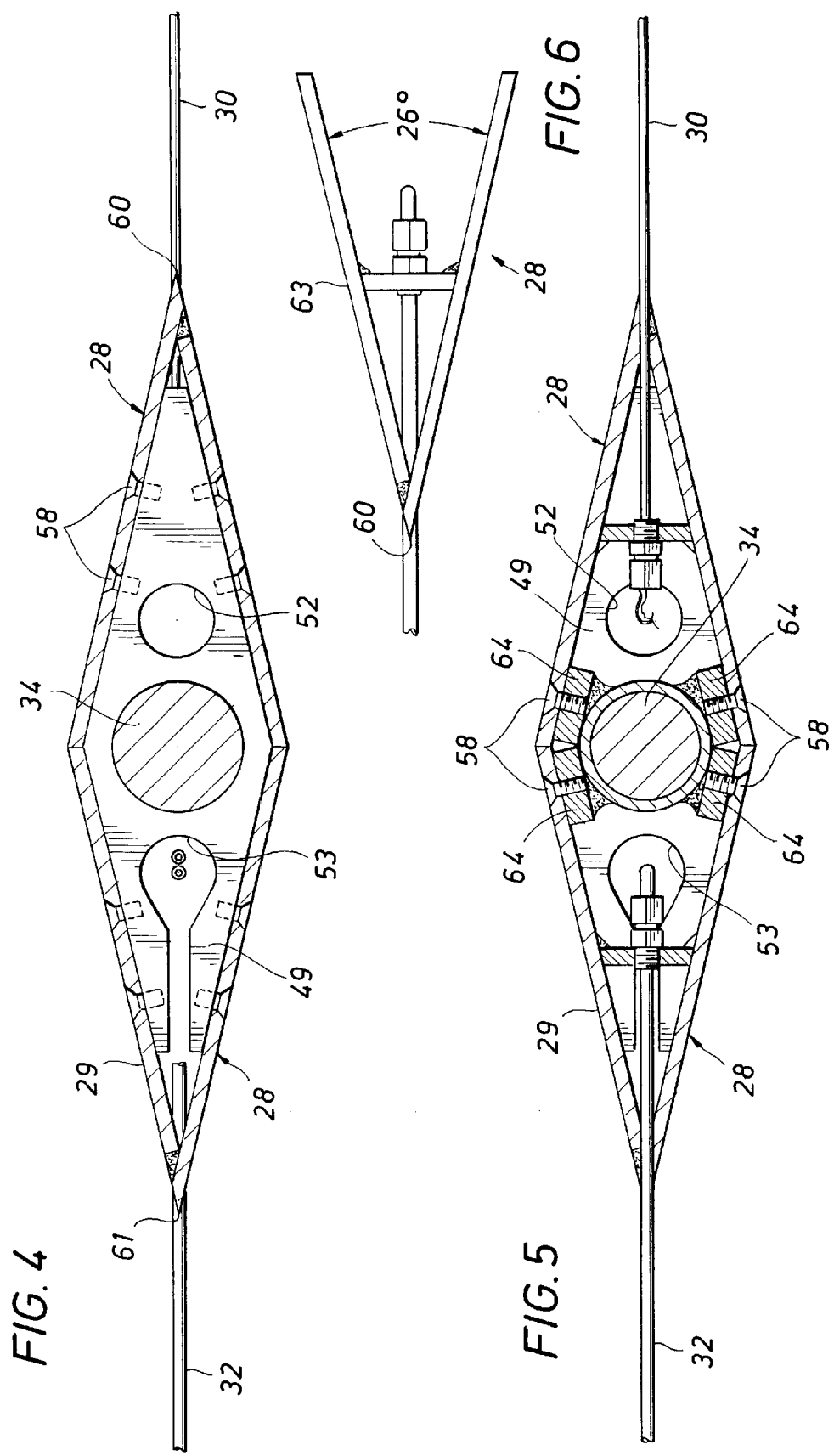

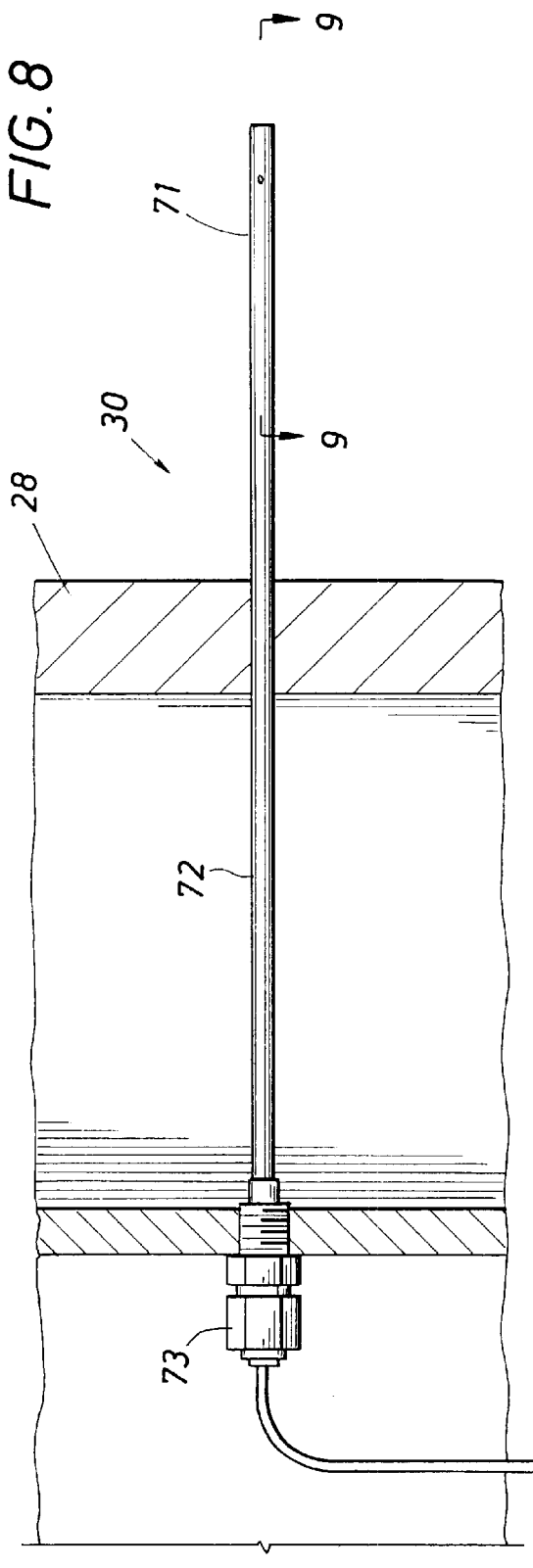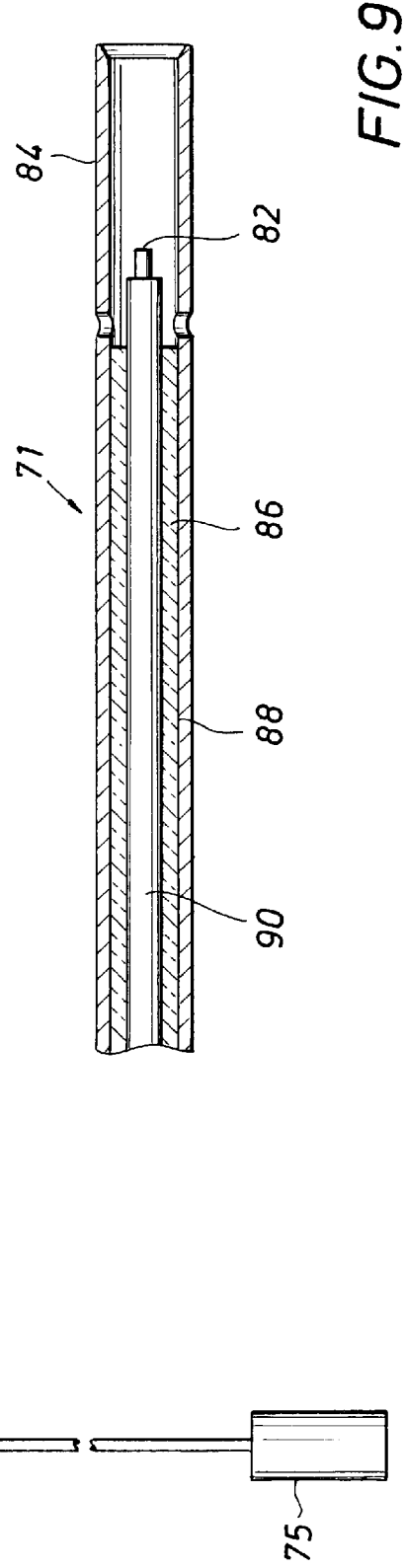

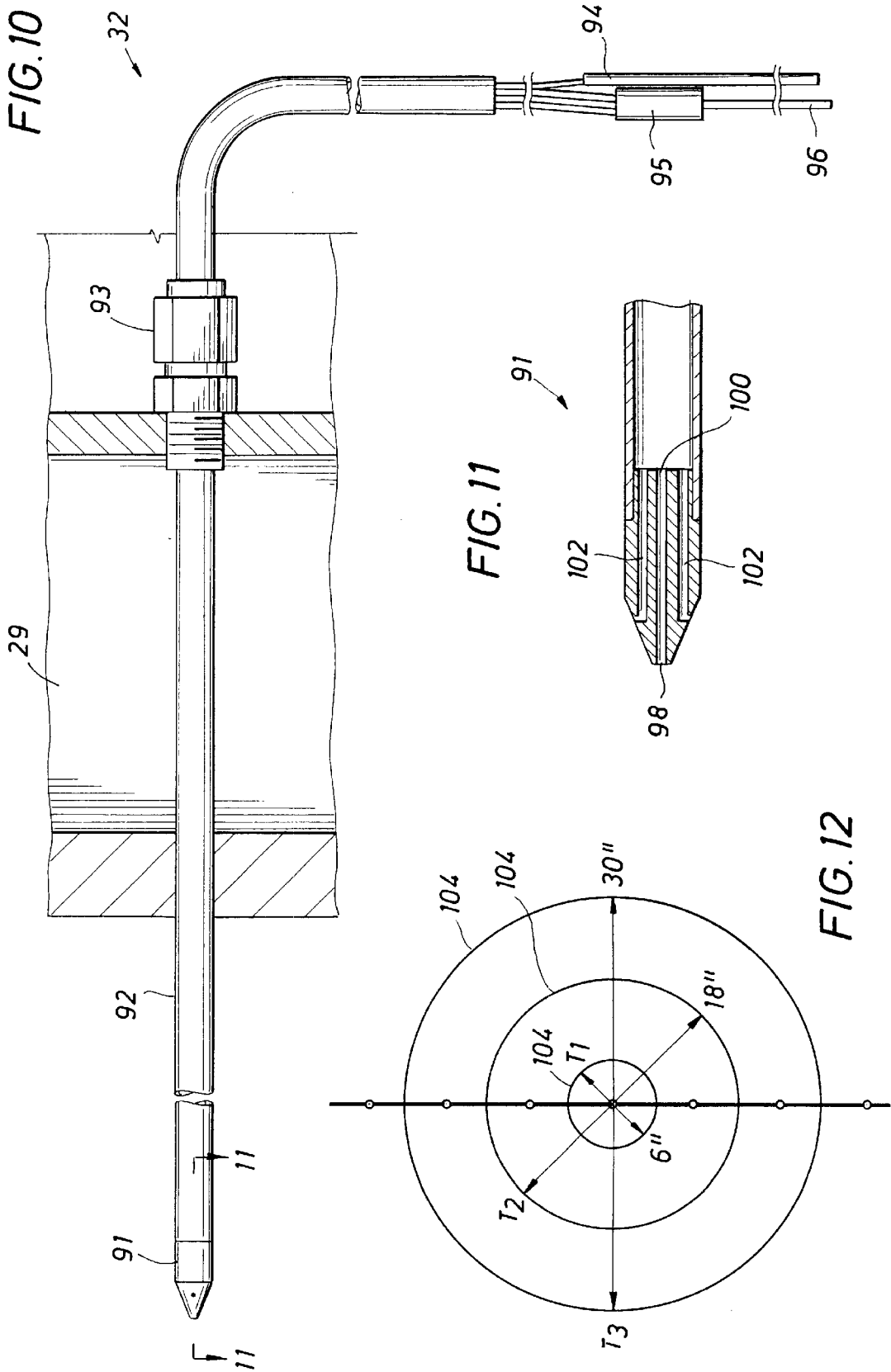

us 6,595,062 B1

HIGH TEMPERATURE RAKE FOR SUSPERSONIC FLOW

Cross-Reference to Related Application

This invention claims the benefits of provisional patent application U.S. Ser. No. 60/240,640, filed Oct. 16, 2000.

BACKGROUND OF THE INVENTION

1. Technical Field

This invention relates to a measurement device for aircraft testing. More particularly, this invention relates to a high temperature rake for measuring the temperature and/or pressure of supersonic exhaust flow from a jet engine.

2. Background of the Invention

The present invention is an apparatus for measuring a parameter, such as the temperature and pressure, of a high temperature supersonic flowing gaseous stream, such as an exhaust gas plume for a military jet. In order to evaluate the performance of a jet engine, the temperature and pressure profiles of the supersonic exhaust gas plume is needed. Heretofore, the prior art temperature and pressure measurement devices for supersonic flow of gaseous streams have been inaccurate. This is due in part to the shock wave or turbulence created by the temperature and pressure sensors and/or associated hardware in the flowing supersonic gaseous stream. In addition, these prior art devices have been unreliable and require extensive maintenance because of the corrosive, high temperature environments in which the devices operate.

Therefore, the need exists for a measurement device which reduces or eliminates the shock wave or turbulence caused by temperature and/or pressure sensors in the supersonic gaseous stream. The need also exists for a measurement device which gives accurate temperature and pressure measurements in corrosive, high temperature gaseous streams at supersonic flow conditions. The present invention meets these needs.

SUMMARY OF THE INVENTION

The invention is an apparatus for measuring a parameter of a corrosive, high temperature gaseous stream, such as an exhaust gas plume from a supersonic military jet engine. The apparatus includes an airfoil having edges, one or more sensors mounted to the airfoil and at least one base. Preferably, the airfoil is rotatable about its axis relative to the base to selectively position one or more sensors in a leading position relative to the exhaust gas flow path. The sensors are impinged by the exhaust gas flow path prior to the exhaust gas flowing over the airfoil to measure a parameter of the exhaust gas. Preferably, the sensors are attached to an airfoil edges and measure a parameter, such as the temperature and/or pressure, of the exhaust gas plume. The base is attached and adapted to be mounted to a supporting surface for locating the airfoil rearward of the exhaust gas plume.

BRIEF DESCRIPTION OF THE DRAWINGS

So that the manner in which the features, advantages and objects of the invention, may be understood in more detail, more particular description of the invention briefly summarized above may be had by reference to the appended drawings, which form a part of this specification. It is to be noted, however, that the drawings illustrate only a preferred embodiment of the invention and is therefore not to be considered limiting of the scope of the invention.

FIG. 2 is a sectional view of the high temperature rake.

FIG. 3 is a sectional view of the rake taken along line 3—3 of FIG. 2.

FIG. 4 is an enlarged sectional view of the rake taken along line 4—4 of FIG. 2.

FIG. 5 is an enlarged view of the rake taken along lines 5—5 of FIG. 2.

FIG. 6 is a side view of an airfoil shield and sensor.

FIG. 8 is a sectional view of a pressure sensor.

FIG. 9 is an enlarged sectional view of FIG. 1 taken along line 9—9.

FIG. 10 is a sectional view of a temperature probe.

FIG. 11 is a sectional view of FIG. 10 taken along line 11—11.

FIG. 12 is a sectional view of FIG. I taken along line 12—12 and illustrates a temperature profile of an exhaust gas plume about a temperature sensor.

DESCRIPTION OF THE PREFERRED EMBODIMENT

The present invention is directed to a device for measuring the temperature and static pressure of a corrosive, high temperature and high pressure gaseous stream. It is expected that the device will encounter gas stream temperatures of about up to 1700° F. and pressures of up to about 50 psia.

Figure 1:
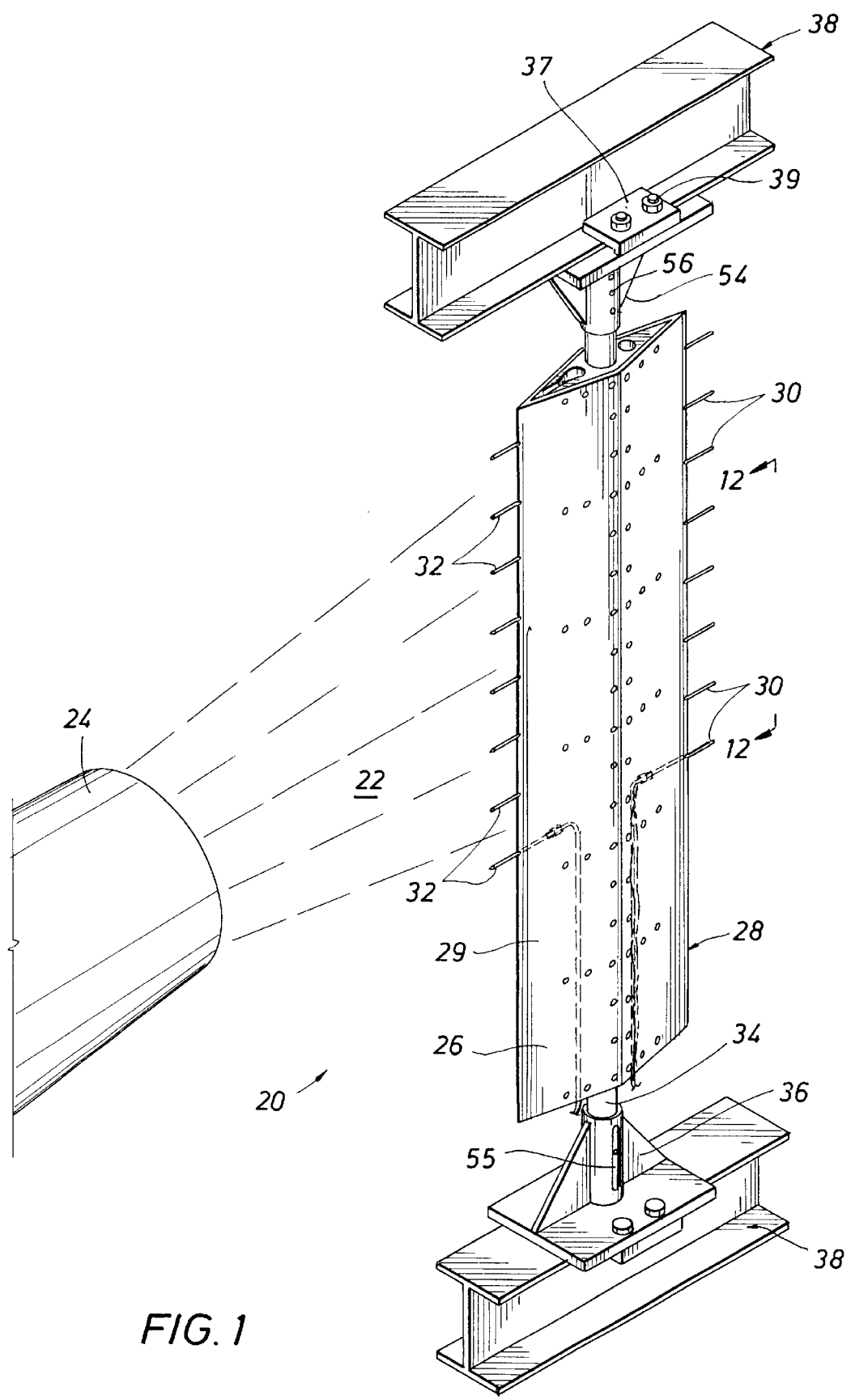
FIG. 1 is a front perspective view of a high temperature rake for supersonic flow that is constructed in accordance with this invention.

In the accompanying drawings, like or corresponding parts or structures are designated by the same reference number. Referring now to FIG. 1, a preferred embodiment of a high temperature and pressure rake 20 is shown. Rake 20 is used to measure a parameter of an exhaust gas plume 22 of jet engine 24, preferably the temperature and/or pressure of exhaust gas plume 22. Rake 20 has airfoil 26 that is attached to shaft 34. Airfoil 26 has a plurality of sensors, preferably temperature and pressure sensors. Temperature sensors 30 measure the temperature of plume 22. Pressure sensors 32 measure the pressure, preferably the total static pressure, of plume 22 of plume 22. These sensors are mounted to the airfoil 26 for being impinged by plume 22 prior to the exhaust gas flowing over airfoil 26. Shaft 34 is inserted into and secured by upper base 54 and lower bases 36. Bases 54, 36 are attached and adapted to be mounted to a support structures 38 for locating the airfoil 26 of rake 20 rearward of exhaust gas plume 22.

Figure 7:
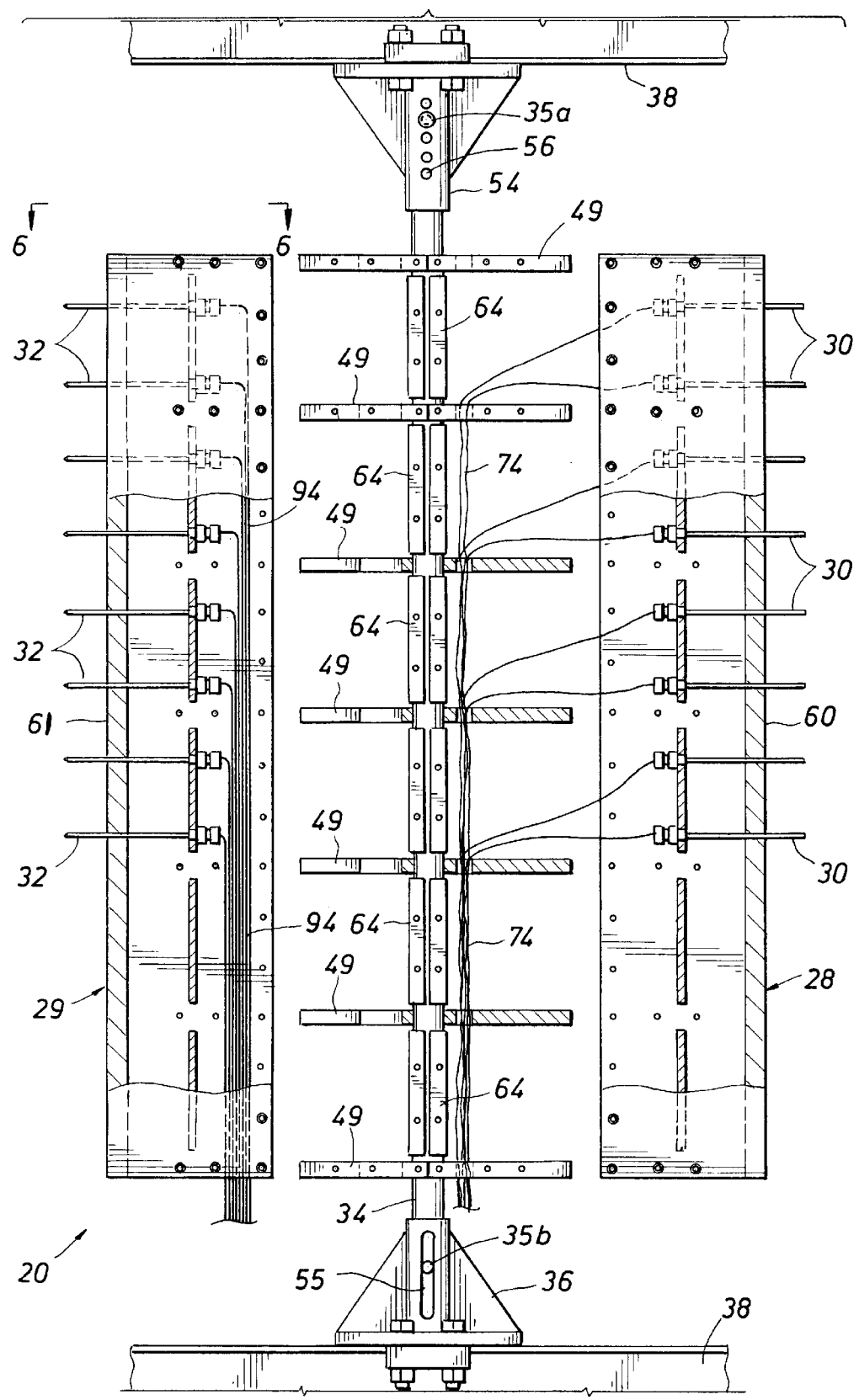
FIG. 7 is an exploded view of FIG. 2.

FIGS. 2–12 show the various components and features of rake 20. A plurality of temperature sensors 30 are inserted into holes (not shown) in a first edge 60 of shield 28, as shown in FIGS. 2 and 7. A plurality of pressure sensors 32 are inserted into holes (not shown) in a second edge 61 of shield 29. Shields 28, 29 together form airfoil 26 which is symmetrical about an axis equidistant between edges 60, 61. Edge 60 is opposite the second edge 61 and has a maximum thickness intermediate between the first and second edges. Airfoil 26 has surface 63 that diverges from edge 60 at an angle of about 26 degrees, as shown in shield 28 of FIG. 6.

Airfoil 26 is attached to shaft 34 via a plurality of ribs 49 and a plurality of plates 64. Plate 64 is a flat member that extends longitudinally along and is welded to shaft 34. Ribs 49 have an airfoil shape and extend outwardly from and are attached to shaft 34 by suitable means, such as welding. Each rib 49 has a guide hole 52 for receiving leads 74 from temperature sensors 30 and an elongated slot 53 for receiving tube 92 from pressure sensors 32, as shown in FIG. 4. Shields 28, 29 fit over and are attached to shaft 34 via plates 64 and ribs 49. Ribs 49 and plates 64 have recessed holes 58 for receiving suitable fasteners to attach shield 28, 29 to shaft 34, as shown in FIGS. 4–5.

Shaft 34 has a first solid end portion 34a and a second end portion 34b with hollow section 34c therebetween, as shown in FIG. 3. First solid end portion 34a and upper base 54 each have holes which are aligned and secured together by suitable means, such as pin 35a. Shields 28, 29 are secured to shaft 34, plate 48 and ribs 49 to form airfoil 26, as shown in FIG. 3.

Lower base 36 has a slot 55 which is aligned with a hole in second solid end portion 34b and held by pin 35b. Slot 55 is elongated to allow for thermal expansion of shaft 34 during the high temperature operation of rake 20. Upper base 54 has a plurality of alignment holes 56 for adjusting the vertical height of rake 20 relative to base 36 within exhaust gas plume 22. Bases 54, 36 are adapted to be mounted to support structures 38. For the upper portion of rake 20, base 54 is secured to support structure 38 by clamp 37 with fastening means 39, such as bolts/nuts and screws. First solid end portion 34a is inserted into base 54. The hole on end portion 34a is aligned with one of alignment holes 56 on base 54. Suitable fastening means, such as a pin 35a, is inserted through the aligned holes to secure the upper portion of shaft 34 to base 54. Hollow section 34c of shaft 34 is attached to first and second solid portions 34a, 34b. The lower portion of rake 20 is structured similarly. Base 36 is secured to support structure 38 by clamp 37. Second solid end portion 34b is inserted into base 36. The hole on end portion 34b is aligned with slot 55 on base 36 and fastened with suitable fastening means, such as pin 35b.

FIGS. 8–9 show temperature sensor 30 for measuring the temperature of a supersonic exhaust gas plume 22. Temperature sensor 30 is a conventional type k thermocouple with an INCONEL® alloy portions for high temperature applications. Sensor 30 has a sheath 72 that is attached to fitting 73. Fitting 73, preferably a swagelock fitting, is used to secure sensor 30 in shield 28 as shown in FIG. 6. Lead 74 is attached to fitting 73 and a electrical connection 75. Electrical connection 75 is connected to sensor conduit 65 (not shown). Temperature sensor 30 is custom-made and may be obtained from suppliers such as Omega Engineering, Inc. in Stanford, Conn.

An enlarged view of end 71 of sheath tube 72 is shown in FIG. 9. Sheath tube 72 is fabricated from INCONEL® 600 alloy and surrounds a ceramic inner tube 86. Tube 86 houses a pair of insulated conductor wires (not shown) and terminates in a bead 82. Bead 82 is set within end 84 of tube 72. The temperature of plume 22 is sensed by bead 82 when bead 82 is exposed to exhaust gas plume 22.

FIGS. 10–11 show pressure sensor 32 for measuring the pressure of a supersonic gas plume 22. Pressure sensor 32 is a conventional conical pressure sensor that is modified for high temperature applications. Sensor 32 includes housing tube 92 attached to head 91. Tube 92 and head 91 may be fabricated from stainless steel or preferably, from an INCONEL® alloy. Fitting 93 is preferably a swagelock fitting and used to secure sensor 32 in shield 29. Tube 92 houses static lines 94 for transmitting the pressure signal to manifold 95. Manifold 95 is connected to sensor conduit 65 (not shown). Pressure sensor 32 may be obtained from such suppliers as United Sensor Corporation in Amherst, N.H.

An enlarged view of head 91 of pressure sensor 32 is shown in FIG. 11. Total pressure orifice 98 is at the distal end of head 91. Also, head 91 has one or more static pressure orifices. Center orifice 100 is concentric with the center tube 92. Side orifices 102 are offset from the center of tube 92 within head 91.

FIG. 12 shows temperature profiles 104 of exhaust gas plume 22 as isothermal lines that are measured by temperature sensors 30. The temperature of the exhaust gas, T1 for example, is about constant at a radial distance of about 6 inches from temperature sensor 30. Similarly, the exhaust gas temperature is constant at T2 and T3, located at radial distances of about 18 inches and 30 inches, respectively.

Airfoil 26 of rake 20 is structured to be selectively positioned in exhaust gas plume 22. Airfoil 26 may be rotated about an axis relative to base member 36 to selectively position edges 60, 61 in the exhaust gas flow path. To measure the temperature of exhaust gas plume, edge 60 is rotated relative to base member 36 to position sensor 30 in a leading position relative to the flow path. In this position, the pressure sensors 32 are outside of the flow path of plume 22 and are not in use. Airfoil 26 may be rotated 180 degrees so that pressure sensors 32 are within the flow path of plume 22 and the pressure, preferably the total static pressure, of plume 22 may be measured. To measure the static pressure of exhaust gas plume 22, edge 61 is rotated relative to base member 36 to position sensor 32 in a leading position relative to the flow path. When jet engine 24 is operating to produce exhaust gas plume 22, the temperature of plume 22 may be measured when an edge of airfoil 40 having temperature sensor 30 is positioned in a leading position in the flow path of plume 22.

The invention has significant advantages. The temperature and pressure instrumentation and sensors yield highly accurate readings for high temperature, supersonic, military jet engine exhaust gas plumes. The airfoil or wedge-shaped design is structured to minimize the flow turbulence or blunt shock proximate the sensor zone. The instrumentation and sensors may be installed on a single shaft and may be conveniently rotated, raised and lowered for various measurements of temperature and/or total static pressure.

The foregoing description of preferred embodiments of the invention has been presented for purposed of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

We claim:

1. An apparatus for measuring a parameter of an exhaust gas plume from a jet engine, comprising:

an airfoil having a first edge;

at least one base adapted to be mounted to a supporting surface for locating the airfoil rearward of an exhaust gas plume, the airfoil being rotatable relative to the base about an axis of the airfoil; and a first sensor mounted to the airfoil for being impinged by the exhaust gas prior to the exhaust gas flowing over the airfoil to measure a parameter of the exhaust gas; and wherein the airfoil is rotatable between a first position, in which the first sensor is in a leading position relative to the exhaust gas flow, and a second position, in which the first sensor is in a trailing position relative to the exhaust gas flow.

2. The apparatus of claim 1 wherein the first sensor is attached to the first edge.

3. The apparatus of claim 1 wherein the airfoil has first surfaces diverging from the first edge.

4. The apparatus of claim 1 wherein the airfoil has a second edge opposite the first edge, the airfoil having a maximum thickness intermediate the first and second edges.

5. The apparatus of claim 4 wherein the airfoil is symmetrical about the axis, the axis being equidistant between the first and second edges.

6. The apparatus of claim 5 wherein the first sensor is on the first edge and the second sensor is on the second edge, the second sensor being in the leading position relative to exhaust gas flow path when the airfoil is rotated to the second position.

7. The apparatus of claim 1 wherein the at least one base comprises 2 bases attached to opposite ends of the airfoil.

8. An apparatus for measuring a parameter of an exhaust gas plume from a jet engine, comprising:
- an airfoil having first surfaces diverging from a first edge and second surfaces diverging from a second edge;
- the airfoil is symmetrical about an axis equidistant between the first and second edges;
- a first sensor attached to the first edge; and
- a second sensor attached to the second edge;
- at least one base adapted to be mounted to a supporting surface for locating the airfoil rearward of an exhaust gas flow; and
- wherein the airfoil is rotatable about its axis relative to the base to selectively rotate the airfoil between a first position, in which the first sensor is in a leading position relative to the exhaust gas flow, and a second position, in which the second sensor is in a leading position relative to exhaust gas flow.

9. The apparatus of claim 8 further comprising a shaft attached to the airfoil and the base for supporting the airfoil.

10. The apparatus of claim 9 wherein the at least one base comprises 2 bases attached to opposite ends of the airfoil.

11. A method for measuring at least one characteristic of exhaust gas flowing from an outlet of a jet engine, the method comprising:
- (a) providing an airfoil having an edge;
- (b) mounting a sensor on the edge of the airfoil;
- (c) locating the airfoil downstream of a jet-engine exhaust gas outlet, the airfoil being rotatable about an axis generally parallel to the edge;
- (d) rotating the airfoil about the axis to position the sensor in a leading position relative to exhaust gas flowing from the outlet;
- (e) measuring a characteristic of the exhaust gas with the sensor as the exhaust gas impinges on the sensor.

12. The method of claim 11, wherein:
- step (a) comprises providing an airfoil having two opposed edges;
- step (b) comprises mounting a sensor on each edge; and
- step (d) comprises rotating the airfoil to position one of the sensors in a leading position relative to the exhaust gas, the other of the sensors being in a trailing position relative to the exhaust gas.

* * * * *